(12) United States Patent
Renau

(10) Patent No.: US 6,214,239 B1
(45) Date of Patent: Apr. 10, 2001

(54) WATER FILTER USAGE MONITORING APPARATUS

(75) Inventor: Karol Renau, Calabasas, CA (US)

(73) Assignee: Renau Corporation, Canoga Park, CA (US)

(*) Notice: Subject to any disclaimer, the term of this patent is extended or adjusted under 35 U.S.C. 154(b) by 0 days.

(21) Appl. No.: 09/526,166

(22) Filed: Mar. 15, 2000

Related U.S. Application Data

(63) Continuation of application No. 09/204,114, filed on Dec. 2, 1998, now abandoned, which is a continuation of application No. 08/762,522, filed on Dec. 9, 1996, now abandoned.

(51) Int. Cl.[7] ................................................ B01D 17/12
(52) U.S. Cl. .......................... 210/739; 210/87; 96/422; 73/861; 73/861.08
(58) Field of Search ........................... 73/861, 861.08, 73/861.78, 861.79, 861.87; 200/81.9 M; 96/422; 340/609; 210/85, 87–89, 94, 138, 282, 739, 767

(56) References Cited

U.S. PATENT DOCUMENTS

| 5,089,144 | 2/1992 | Ozkahyaoglu et al. | 210/87 |
| 5,128,034 | 7/1992 | Kool | 210/282 |
| 5,131,277 | 7/1992 | Birdsong et al. | 210/87 |
| 5,236,578 | 8/1993 | Oleskow et al. | 210/87 |
| 5,254,242 | 10/1993 | Van Der Meer et al. | 210/87 |
| 5,328,597 | 7/1994 | Boldt et al. | 210/87 |
| 5,520,058 | 5/1996 | Campbell et al. | 73/861.08 |
| 5,540,107 | 7/1996 | Silverman et al. | 73/861.78 |
| 5,858,215 | 1/1999 | Burchard et al. | 210/87 |

FOREIGN PATENT DOCUMENTS

| 101532 | * | 2/1984 | (EP) | 73/861 |
| 2205167 | * | 11/1988 | (GB) | 73/861.08 |
| 2219662 | | 12/1989 | (GB) | 73/861.08 |
| 1315809 | * | 6/1987 | (SU) | 73/861 |
| 1620844 | | 1/1991 | (SU) | 73/861.08 |

* cited by examiner

Primary Examiner—Joseph W. Drodge
(74) Attorney, Agent, or Firm—Fulwider Patton Lee & Utecht, LLP

(57) ABSTRACT

As apparatus for monitoring usage of a replaceable water filter is adapted to determine the extent of filter usage and indicate the need for filter replacement. It includes elements for processing the flow of water over time to determine the extent of filter usage, and elements for activating and deactivating the processing elements upon starting and stopping of water flow. It further includes elements for indicating the extent of filter usage as determined by the processing elements by comparison to preset levels. The elements include a single magnet which is freely movable within a housing channel whose movement is solely responsive to pressure changes brought about by the stopping and starting of the water flow.

23 Claims, 2 Drawing Sheets

WATER FILTER USAGE MONITORING APPARATUS

RELATED APPLICATIONS

This application is a continuation of application Ser. No. 09/204,114, filed Dec. 2, 1998, now abandoned, which is a continuation of application Ser. No. 08/762,522, filed Dec. 9, 1996, now abandoned.

BACKGROUND OF THE INVENTION

1. Field of the Invention

This invention relates generally to water filtering systems. It relates specifically to an apparatus for monitoring usage of a water filter to determine and indicate the need for filter replacement.

2. Description of the Related Art

Water filter systems in counter-top faucet fixtures for drinking water previously have included a carbon filter in a stainless steel tank. After use of the filter over time, for example after three years, the carbon filter should be replaced. However, without an indication of the extent of filter usage, the user may not be aware that the carbon filter should be replaced.

SUMMARY OF THE INVENTION

The apparatus of the invention overcomes the above problems and others associated with prior systems.

It comprises an apparatus for monitoring usage of a water filter, adapted to determine the level of filter usage and indicate the need for filter replacement.

The apparatus includes elements for determining the extent of filter usage, which include elements for processing the flow of water over time, and elements for activating and deactivating the processing elements upon starting and stopping of water flow. The processing elements include a microprocessor, and elements for electronically activating the microprocessor. The activating-deactivating elements include a magnet, movable responsive to starting of water flow and water pressure resulting therefrom, and stopping of water flow and loss of water pressure resulting therefrom, and elements for sensing movement of the magnet and activating or deactivating the processing elements responsive thereto.

It further includes elements for indicating the level of filter usage as determined by the determining elements. The indicating elements include a plurality of indicator lights, adapted such that one of the plurality of indicator lights turns on in sequence dependent upon the level of filter usage as determined by the determining elements.

DESCRIPTION OF THE PREFERRED EMBODIMENT

Figure 1:
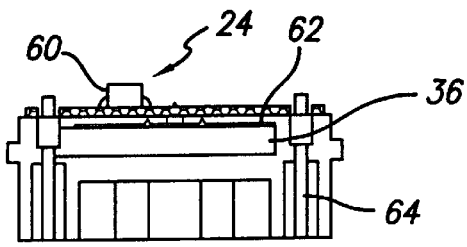
FIG. 1 is an elevational sectional partly-exploded view of the water filter usage monitoring apparatus of the invention.
Figure 2:
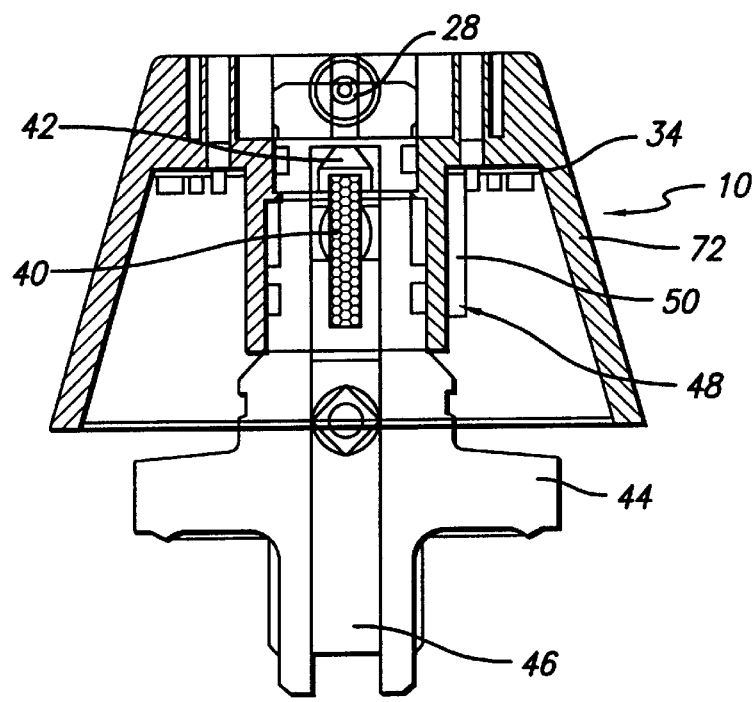
FIG. 2 is a top plan view of the processor and electrically-activating elements of the apparatus.
Figure 2:
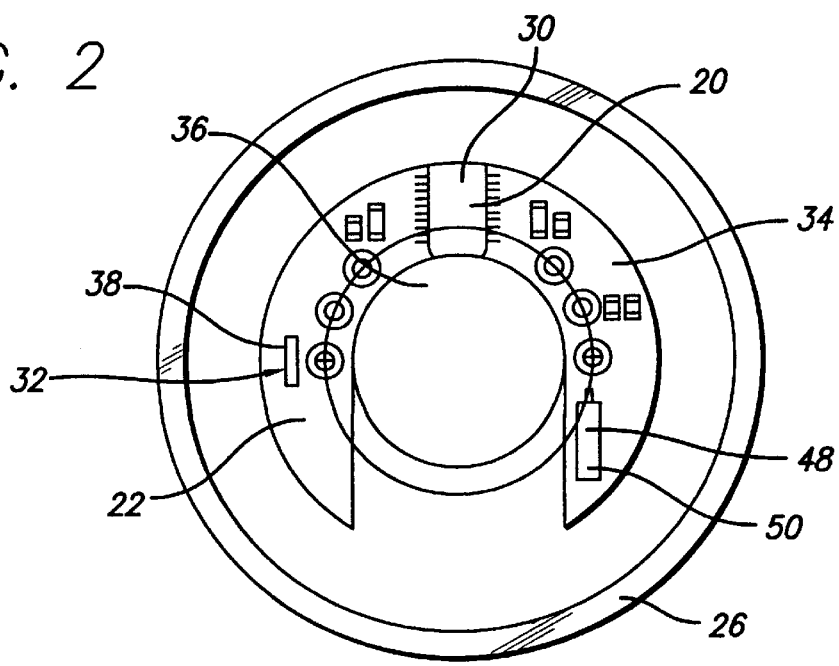
Figure 3:
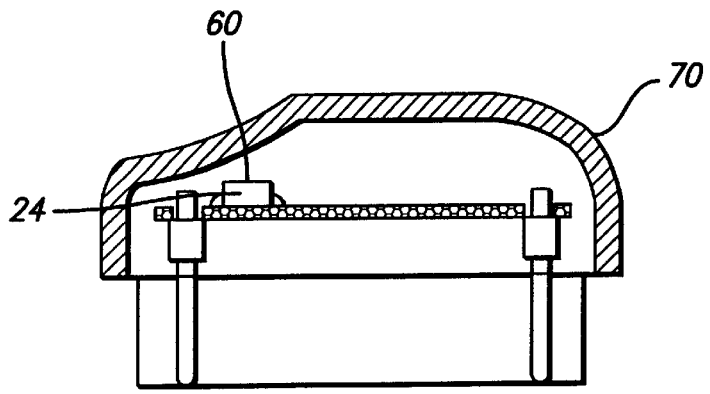
FIG. 3 is a side elevational sectional view of the cap and indicating elements of the apparatus.
Figure 4:
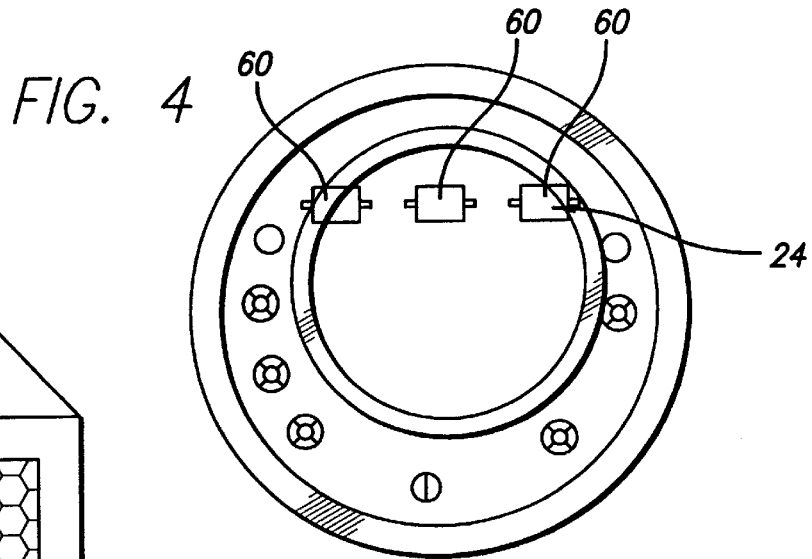
FIG. 4 is a top plan view of the indicating elements of the apparatus.
Figure 5:
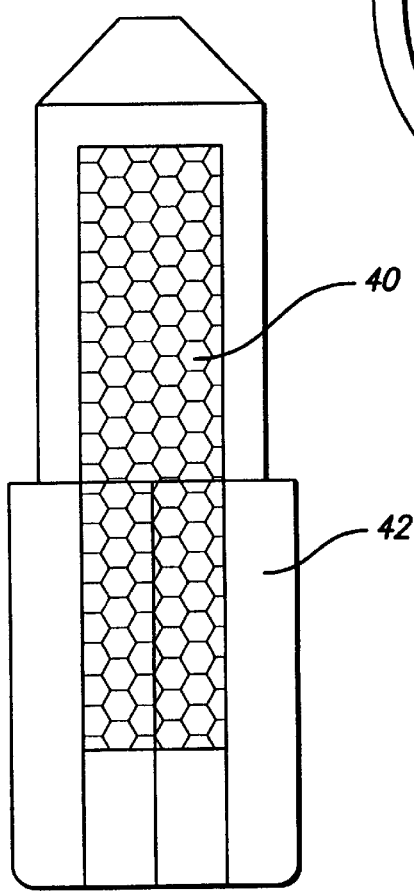
FIG. 5 is an elevational view of the magnet and casing in the apparatus of the invention.

In the exemplary embodiment as shown in FIGS. 1–5, apparatus 10 is adapted to monitor usage of a water filter to determine the level of filter usage, to compare the determined level to preset levels, and to indicate the need for filter replacement based on the extent of filter usage. Apparatus 10 is modular, such that it is replaceable when the filter is being replaced.

Apparatus 10 includes elements 20 for processing the flow of water through the filter over time, to determine the level of filter usage and to compare the determined level to preset levels, elements 22 for activating and deactivating processing elements 20 upon starting and stopping of water flow, and elements 24 for indicating filter usage as determined by processing elements 20, to indicate the need for filter replacement.

Apparatus 10 further includes a housing 26 in which processing elements 20, activating-deactivating elements 22, and indicating elements 24 are mounted. Housing 26 has an opening 28 therein for dispensing water therethrough.

Processing elements 20 include a microprocessor 30, and elements 32. for electronically activating microprocessor 30, mounted on a printed circuit board 34. Electronically activating elements 32 include a battery 36 adapted to be useable for substantially the life of a filter, for example for about three years, and an oscillator 38 for accurate system timing, connected to microprocessor 30.

Activating-deactivating elements 22 include a magnet 40 encased in a casing 42, and a housing 44 which has a channel 46 in which magnet 40 is reciprocally movable, connected to housing 26. It further includes an element 48 for sensing movement of magnet 40 to activate and deactivate processing elements 20. Magnet 40 is adapted to be reciprocally movable in channel 46 of housing 44 between first and second positions responsive to starting of water flow and water pressure resulting therefrom, and stopping of water flow and loss of water pressure resulting therefrom. The first and second positions of magnet 40 may comprise a first position at which magnet 40 is at rest and a second position to which magnet 40 is movable by water pressure resulting from the flow of water through channel 46.

Magnet movement sensing element 48 is adapted to sense movement of magnet 40, to activate microprocessor 30 upon starting of water flower and water pressure resulting therefrom and movement of magnet 40 from the first position towards the,second position as a result thereof, and to deactivate microprocessor 30 upon stopping of water flow and loss of water pressure resulting therefrom and movement of magnet 40 from the second position towards the first position as a result thereof. It comprises a reed relay switch 50.

Indicating elements 22 comprise a plurality of indicator lights 60 mounted on a pc board 62, and pins 64 connectable to pc board 34. One of the plurality of indicator lights 60 turns on dependent upon the level of filter usage as determined by microprocessor 30. In the exemplary embodiment as shown as in FIG. 4, there are three indicator lights 60, each of a different color, preferably green, yellow, and red. The green light turns on from the time water first starts to flow until a first preset level of water flow over time is reached as determined by microprocessor 30, and indicates that the filter does not need to be replaced. The yellow light turns on from the time the first level is reached until a second preset level is reached as determined by microprocessor 30, and indicates that the filter will need to be replaced. The red light turns on from the time the second preset level is reached, and indicates that the filter needs to be replaced.

Housing 26 includes a cap 70, in which indicating elements 24 are mounted, an outlet housing 72, in which processing elements 20 and activating-deactivating elements 22 are mounted, and connecting elements 74 for connecting outer housing base 62 and cap 70 so as to substantially seal housing 26 to prevent water from leaking thereinto.

To install apparatus 10, housing 26 is mounted in a sink fixture, and a filter cartridge is connected to housing 44. A source of water is connected to the filter such that water may flow through the filter and apparatus 10.

Upon connection of cap 70 outlet housing 72, apparatus 10 is in reset mode to indicate that it is ready for operation, such that for example indicator lights 50 flash in sequence cycling through green, yellow and red five times.

In operation, upon starting the flow of water and generating water pressure resulting therefrom, pressurized water flows through the filter and into channel 46 in housing 44, moving magnet 40 from a first position towards the second position shown in FIG. 1. As magnet 40 moves towards the second position, the reed element in reed switch 50 is attracted in the direction thereof, closing the switch in reed switch 50 and activating electronic elements 32 and microprocessor 30, such that microprocessor 30 turns on and processes the flow of water over time to determine the level of filter usage. Indicator lights 60 are activated so as to turn on, dependent upon the level of filter usage as determined by microprocessor 30. In the exemplary embodiment shown in FIG. 1, the green light would turn on for a time when the filter did not need to be replaced, the yellow light would turn on for a time when the filter will need to be replaced, and the red light would turn on for a time when the filter needed to be replaced.

Upon stopping the flow of water and loss of water pressure resulting therefrom, magnet 40 moves from the second position shown in FIG. 1 towards the first position. As magnet 40 moves towards the first position, the reed element in reed switch 50 returns to its original position, opening the switch in reed switch 50 and deactivating electronic elements 32 and-microprocessor 30, such that microprocessor 30 turns off and stops processing the level of filter usage.

A preferred embodiment of the invention has been set forth above, for the purpose of explaining the invention. However, it is to be understood that variations in such embodiment may be made which are nevertheless within the scope and spirit of the invention as set forth in the claims.

I claim:

1. A system for metering the flow of a fluid through a filter to determine the level of filter usage for enabling a determination regarding filter replacement, in which a source of the fluid is adapted to be connectable to the filter such that the fluid may flow through the filter and the system, comprising:

a housing having a channel therein, adapted to be mounted in the path of fluid flow through the system, such that fluid is adapted to flow through the housing channel; and means for determining the level of filter usage, comprising means for determining the volume of the flow of fluid based solely upon the volume of fluid flow over time, adapted to compare the determined level of filter usage to a predetermined level of filter usage based upon the volume of fluid flow over time to determine the level of filter usage, means for activating and deactivating the volume determining means upon the starting and the stopping of fluid flow, wherein the activating-deactivating means comprise a single magnet, freely movable within the housing channel responsive solely to fluid pressure upon the starting and the stopping of the flow of fluid through the housing channel in the path of fluid flow through the system so as to activate and de-activate the volume determining means, and means for sensing the movement of the single magnet and for responding thereto to activate or deactivate the volume determining means.

2. The system of claim 1, wherein the single magnet is freely movable without being constrained by a biasing force, and is adapted to activate and deactivate the volume determining means substantially instantaneously responsive solely to fluid pressure and not to a biasing force.

3. The system of claim 1, wherein the housing channel is generally uniform in diameter for reciprocal movement of the single magnet therein.

4. The system of claim 1, wherein the housing channel is generally straight and without any bend therein.

5. The system of claim 1, wherein the volume determining means comprises means for processing data.

6. The system of claim 5, in which the data processing means comprises a microprocessor, and further comprising means for electronically activating the microprocessor.

7. The system of claim 1, in which the single magnet is adapted to be reciprocally movable between first and second positions upon starting and stopping of the fluid flow, and the sensing means is adapted to activate the volume determining means upon starting of the fluid flow and movement of the single magnet from the first position towards the second position as a result thereof, and to deactivate the volume determining means upon stopping of the fluid flow and movement of the single magnet from the second position towards the first position as a result thereof.

8. The system of claim 1, in which the sensing means comprises a reed switch.

9. The system of claim 1, further comprising means for indicating the level of filter usage as determined by the determining means, to indicate the need for filter replacement.

10. The system of claim 9, in which the indicating means comprises a plurality of indicator lights.

11. The system of claim 10, in which the plurality of indicator lights are adapted such that one of the plurality of indicator lights turns on dependant upon the level of filter usage as determined by the processing means.

12. The system of claim 10, wherein the plurality of indicator lights are adapted such that one of the plurality of indicator lights turns on dependent upon the level of filter usage as determined by the volume determining means, and wherein the plurality of indicator lights comprise a first indicator light, adapted to turn on from the time the water first starts to flow until the first preset level of water flow over time is reached to indicate that the filter does not need to be replaced, a second indicator light, adapted to turn on from the time the first preset level is reached until a second preset level is reached to indicate that the filter will need to be replaced, and a third indicator light, adapted to turn on from the time the second preset level is reached to indicate that the filter needs to be replaced.

13. The system of claim 12, wherein the first indicator light is a light of a first color, the second indicator light is a light of a second color different from the first color, and the third indicator light of a third color different from the first and second colors.

14. The system of claim 12, wherein the first indicator light is a light of a green color, the second indicator light is a light of a yellow color, and the third indicator light is a light of a red color.

15. The system of claim 1, wherein the housing channel from a fluid inlet through the area wherein the single magnet is movable is generally straight.

16. The system of claim 1, in which the housing further includes a base portion in which the volume determining means and the activating-deactivating means are mounted.

17. The system of claim 16, in which the housing further includes a head portion in which the indicating means is mounted.

18. The system of claim 1, in which the housing further includes a head portion, a base portion in which the volume determining means and the activating-deactivating means are mounted, and means for connecting the head portion and the base portion.

19. The system of claim 1, in which the activating-deactivating means include a battery, connected to the volume determining means.

20. The system of claim 19, in which the activating-deactivating means further includes an oscillator, connected to the battery for converting the battery direct current into alternating current for the volume determining means, and connected to the volume determining means.

21. A system for metering the flow of a fluid through a filter to determine the level of filter usage for enabling a determination regarding filter replacement, in which a source of the fluid is adapted to be connectable to the filter such that the fluid may flow through the filter and the system, comprising:
- a housing having a channel therein, adapted to be mounted in the path of fluid flow through the system, such that fluid is adapted to flow through the housing channel; and
- an element for determining the level of filter usage, comprising an element for determining the volume of the flow of fluid based solely upon the volume of fluid flow over time, adapted to compare the determined level of filter usage to a predetermined level of filter usage based upon the volume of fluid flow over time to determine the level of filter usage, an element for activating and deactivating the volume determining element upon the starting and the stopping of fluid flow, wherein the activating-deactivating element comprises a single magnet, freely movable within the housing channel responsive solely to fluid pressure upon the starting and the stopping of the flow of fluid through the housing channel in the path of fluid flow through the system so as to activate and deactivate the volume determining element, and an element for sensing the movement of the single magnet and for responding thereto to activate or deactivate the volume determining element.

22. A method of metering the flow of a fluid through a filter to determine the level of filter usage for enabling a determination regarding filter replacement, in which a source of the fluid is adapted to be connectable to the filter such that the fluid may flow through the filter and the system, in a system which comprises a housing having a channel therein, adapted to be mounted in the path of fluid flow through the system, such that fluid is adapted to flow through the housing channel, and means for determining the level of filter usage, comprising means for determining the volume of the flow of fluid based solely upon the volume of fluid flow over time, adapted to compare the determined level of filter usage to a predetermined level of filter usage based upon the volume of fluid flow over time to determine the level of filter usage, means for activating and deactivating the volume determining means upon the starting and the stopping of fluid flow, wherein the activating-deactivating means comprises a single magnet, freely movable within the housing channel responsive solely to fluid pressure upon the starting and the stopping of the flow of fluid through the housing channel in the path of fluid flow through the system so as to activate and deactivate the volume determining means, and means for sensing the movement of the single magnet and for responding thereto to activate or deactivate the volume determining means, wherein the method comprises:
- determining the level of filter usage, comprising:
  - determining the volume of the flow of fluid based solely upon the volume of fluid flow over time, which comprises comparing the determined level of filter usage to a predetermined level of filter usage based upon the volume of fluid flow over time to determine the level of filter usage;
  - activating and deactivating the volume determining means upon the starting and the stopping of fluid flow, wherein the single magnet freely moves within the housing channel responsive solely to fluid pressure upon the starting and the stopping of the flow of fluid through the housing channel in the path of fluid flow through the system so as to activate and deactivate the volume determining means; and
  - sensing the movement of the single magnet and responding thereto to activate or deactivate the volume determining means.

23. A method of metering the flow of a fluid through a filter to determine the level of filter usage for enabling a determination regarding filter replacement, in which a source of the fluid is adapted to be connectable to the filter such that the fluid may flow through the filter and the system, in a system which comprises a housing having a channel therein, adapted to be mounted in the path of fluid flow through the system, such that fluid is adapted to flow through the housing channel, and an element for determining the level of filter usage, comprising an element for determining the volume of the flow of fluid based solely upon the volume of fluid flow over time, adapted to compare the determined level of filter usage to a predetermined level of filter usage based upon the volume of fluid flow over time to determine the level of filter usage, an element for activating and deactivating the volume determining element upon the starting and the stopping of fluid flow, wherein the activating-deactivating element comprises a single magnet, freely movable within the housing channel responsive solely to fluid pressure upon the starting and the stopping of the flow of fluid through the housing channel in the path of fluid flow through the system so as to activate and deactivate the volume determining element, and an element for sensing the movement of the single magnet and for responding thereto to activate or deactivate the volume determining element, wherein the method comprises:
- determining the level of filter usage, comprising:
  - determining the volume of the flow of fluid based solely upon the volume of fluid flow over time, which comprises comparing the determined level of filter usage to a predetermined level of filter usage based upon the volume of fluid flow over time to determine the level of filter usage;
  - activating and deactivating the volume determining element upon the starting and the stopping of fluid flow, wherein the single magnet freely moves within the housing channel responsive solely to fluid pressure upon the starting and the stopping of the flow of fluid through the housing channel in the path of fluid flow through the system so as to activate and de-activate the volume determining element; and
  - sensing the movement of the single magnet and responding thereto to activate or deactivate the volume determining element.

* * * * *